Patented Jan. 30, 1951

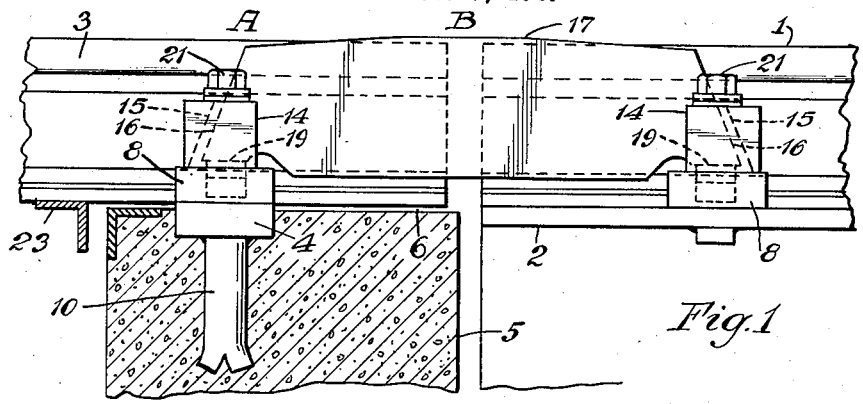
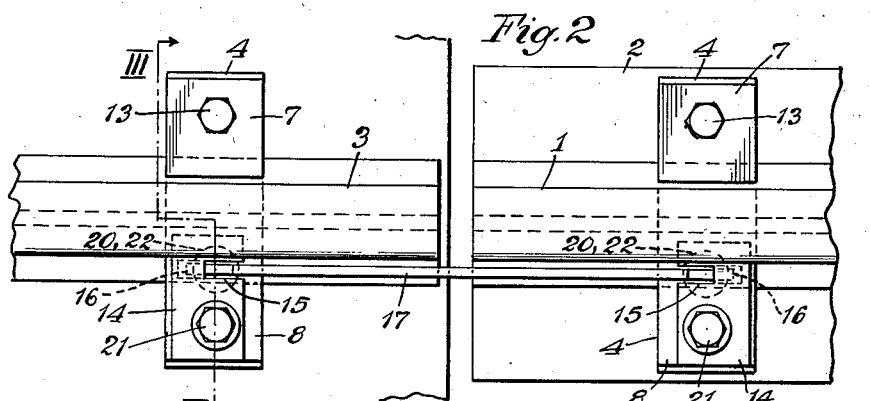
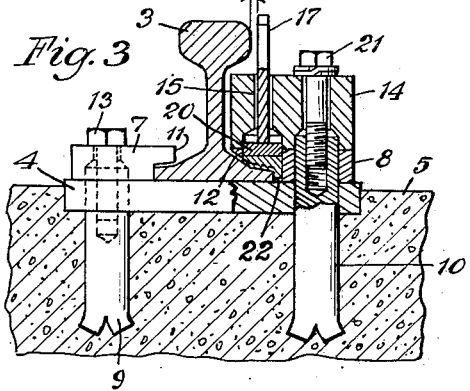
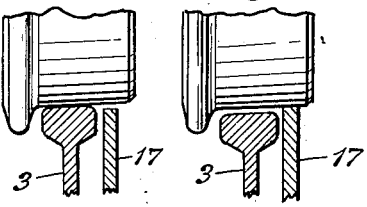

2,539,650

UNITED STATES PATENT OFFICE 2,539,650

RAIL BRIDGING DEVICE FOR RAIL WEIGHING DEVICES

Armin Wirth, Zurich, Switzerland

Application February 9, 1948, Serial No. 7,030
In Switzerland November 15, 1941

Section 1, Public Law 690, August 8, 1946
Patent expires November 15, 1961

6 Claims. (Cl. 238—218)

The present invention relates to rail weighbridges and to like appliances; such appliances are generally constructed with a gap in the rails at the point of entry onto the weighbridge, such constructions are cheap to manufacture and simple and cheap in use. The rail gap with the previous constructions is disadvantageous however, for when travelling onto such a weighing divide the wheel of a vehicle to be weighed rolls off the rail fastened to the end wall of the weighing pit, and passes over the rail gap onto the rails of the weighbridge. The shock produced leads to rapid wear of the ends of the rails. In certain constructions of the device however other parts of the weighing device can also be worn rapidly. Further difficulties in operation with the previous construction are concerned with the rail fastening on the rear wall of the weighing pit. Movement of the ends of the rails as a result of temperature effects can easily be obviated. Since the rails of the weighbridge are not clamped in their supports on both sides of the rail sections as in open stretches, and also since there is not the resistance of the adjacent rails against extreme expansion, the free ends of the rails of the weighing device with rail gap always tend to move with increasing temperature to a considerable extent. The rail clearance cannot be made very small for otherwise with increasing temperature the bridge will jam and thereby the free play of the weighing device is hindered. A further disadvantage of using such a rail gap is the fact that both the ends of the rails on the end wall of the pit and also the rails associated with the weighbridge, tend to have a different level at the moment of passage as a result of the elastic yield. One rail end is fully loaded, the other is not, so that the impact produces a rapid wear of the rail ends especially when the clearance is large.

If an attempt were made to retain the rail ends rigidly in such a manner that the elastic flexure of the rail parts was a minmum and that a lengthwise movement of the rail on the end walls of the pit was impossible, it would be found, however, that forces are produced in most cases, which even with the strongest construction of the bridging device, destroy these devices or the end wall in time.

The bridging device according to the invention avoids these disadvantages by providing a bridging piece at the points of the rail joints which bridging piece can take up the wheel load and of which one end bears on the weighbridge.

Several constructive examples of the subject matter of the invention are shown on the accompanying drawing by way of example, in which:

Figs. 1 to 3 show a first constructive example of the rail bridging device in elevation, in plan and in section on III—III Fig. 2, Fig. 4 is a section through the rails and bridgepiece when the wheel is at the position A (Fig. 1), Fig. 5 is a section through the rails and the bridgepiece when the wheel is at the point B (Fig. 1), Fig. 6 shows the use of a rail of smaller profile for the bridging piece, for a second embodiment, Fig. 7 shows in plan an embodiment with recessing of the rail head, for example for small gauge tracks, Fig. 8 shows diagrammatically another embodiment in side view.

The rail 1 is the bridge rail; it lies as a rule for its whole length directly on the support 2 of the weighbridge. The rail end 3 of the connecting track however lies only on the sole plate 4. This is embedded on the end wall 5 of the pit. The masonry of the end wall 5 of the pit does not however extend as far as the foot of the rail but the upper surface of the sole plate 4 lies higher than the upper surface of the end wall 5 of the pit by the amount of the gap 6. The rail end 3 can thus flex under the influence of the wheel load according to the elastic deformation of the rail around a horizontal transverse axis, without the masonry of the pit end wall 5 being touched by the rail foot.

In the lateral direction the foot of the rail 3 is secured, between the rails of the track, by means of a plate 7 and, outside the rails, by a plate 8, in a manner determining the gauge, since the plate 7 is secured against horizontal movement by the stud 9 and the plate 8 is fixed by the traversing stud 10. The nose 11 of the plate 7 as well as the nose 12 of the plate 8 have some play against the foot of the rail, so that the rail end 3 can lift somewhat and can flex to a sufficient extent under the influence of the wheel load. Clamping of the foot of the rail in relation to the vertical transverse axis of the rail is thus not possible. The plates 7 and 8 are secured against rotation in the horizontal plane by abutment against the side surfaces of the rail foot. The rail ends 3 may slide somewhat in the longitudinal direction under the influence of temperature changes, while transverse movement and consequently changes in the gauge are not possible. The plate 7 is clamped firmly by means of the screw 13 screwing into the stud 9. Above the clamp plate 8 is the abutment block 14 which embodies a recess 15 in which lies the end 16 of the bridgepiece 17. As a result of the sloping of the ends 16 and the inclined stop surfaces of the recesses 15 in the abutment block 14, the bridgepiece 17 is secured against springing out.

The bridgepiece 17 may slide in the longitudinal direction to a considerable extent as the weighbridge itself has play in the longitudinal direction. Since the supporting and abutment parts for the bridgepiece have no connection with the rails they can transmit no forces to the rails in the longitudinal direction. The thickness of the bridgepiece 17 is smaller than the width of the recesses 15 in the abutment block 14. This play in the transverse direction, as well as the distance C (Fig. 3) are so proportioned that transverse swinging of the weighbridge cannot transmit horizontal forces to the bridgepiece 17 and to the abutment block 14.

The bridgepiece 17 embodies a wedge-like run-on and-off and rests, by means of the surfaces 19, on the cylindrical bearer pieces 20. These latter can be preselected at various heights so that on assembly and in use, possible wear of the rails and of the bridgepiece can be balanced. The supports 20 also secure the abutment block 14 against sliding and rotation in the horizontal plane; said block 14 is secured by means of the screw 21. Below the support 20 is a shaped piece 22 the underside of which corresponds to the form of the rail foot, and located in the same bore of the plate 8 as the support 20. Thereby the abutment block 14 is secured on the end wall of the pit in definitive manner. If the wheel load is on the bridgepiece 17 the load is transmitted by means of the supports 20 and the shaped piece 22 onto the foot of the rail. Thus, when a wheel runs onto the bridge, first the rail 3 is loaded, this is transferred to the plate 4. Progressively the wheel rolls onto the bridgepiece 17 which takes progressively an increased portion of the load. Even in this case this portion of the load is transmitted back to the rails and only if the wheel load is partially on the bridge rail is there a considerable depression of the rail end 3 onto the end wall of the pot. Thereby any considerable changes in level under the influence of the load are avoided between the bridgepiece 17 and the rail ends 3 and 1. Even with rapid travel no striking or impact effect is to be feared.

On the side of the bridge, the determinative method of fastening of the abutment block is the same as on the end wall side. In many cases however the noses 11 and 12 of the plates 7 and 8 may have no play relatively to the rail foot; in certain cases however for example with a loose rail on a ferroconcrete bridge, the fastening may be effected in the same manner as on the end wall.

Fig. 6 shows that, as bridgepiece, a rail of smaller profile can be used. If necessary the profile can be modified to the required form for use. In certain circumstances, for example with small gauge railways, the wheel profile is so small that a bridge piece beside the rail head lies wholly or partially outside the outermost wheel edge. In this case the rail head at the ends of the rails is cut away as shown in Fig. 7. The bridgepiece 17 can also according to Fig. 8 be plane and the rails 1 and 3 can be produced with wedge-shape off-runs.

For security against extreme rail expansion a stop 23 can also be provided according to Fig. 1 which limits expansion of the rail of the connecting track to the permissible amount.

Having now particularly described and ascertained the nature of my said invention and in what manner the same is to be performed, I declare that what I claim is:

1. A rail bridging device for track scales, comprising, in combination with a track rail and a scale rail alining therewith and carried by a scale platform, a bridgepiece disposed adjacent said track rail and scale rail and crossing the joint therebetween, said bridgepiece resting loosely with its ends upon supports resting in turn upon the foot of the rails, clamping plates for preventing lateral movements of said rails, said clamping plates being recessed to receive said supports to prevent displacement of the same in horizontal directions, and means on said clamping plates for slidably receiving the ends of said bridgepiece and limiting any vertical movement of the same.

2. A rail bridging device according to claim 1, in which the top faces of the rails running horizontally to the rail gap and that the bridgepiece has wedge shape on- and off-runs.

3. A rail bridging device according to claim 1, in which the top faces of the rails at the rail gap having a wedge shape off-run while the running surface of the bridgepiece is straight and horizontal.

4. A rail bridging device for track scales, comprising, in combination with a track rail and a scale rail alining therewith and carried by a scale platform, a bridgepiece disposed adjacent said track rail and scale and crossing the joint therebetween, clamping plates engaging the foot of the rails for preventing lateral displacement of the same, one clamping plate at each rail being provided with a recess, bearing members in each recess of the foot of the rails, said bearing members freely supporting the ends of said bridgepiece and permitting transverse, longitudinal and vertical movement of said bridgepiece, and means fixedly secured to said recessed clamping plates for permitting limited play of said bridgepiece in longitudinal.

5. A rail bridging device for track scales, comprising, in combination with a track rail and a scale rail alining therewith and carrier by a scale platform, a bridgepiece disposed adjacent said track rail and scale rail and crossing the joint therebetween, clamping plates engaging the foot of the rail for preventing lateral displacements of the some, one clamping plate at each rail being provided with a recess, bearing members in each recess and resting on top of the foot of the rails, said bearing members freely supporting the ends of said bridgepiece and permitting transverse, longitudinal and vertical movement of said bridgepiece, the end faces of said bridgepiece being inclined to form an acute angle with the bottom face thereof, and abutment blocks fixedly secured to said clamping plates and having abutment faces parallel but spaced from the adjacent end faces of said bridgepiece, the clearance between the opposed faces of said abutment faces and end faces being such to permit a longitudinal displacement of the bridgepiece but preventing a vertical springing out of the same from between the abutment blocks.

6. A rail bridging device as claimed in claim 5, in which said abutment blocks are provided each with a recess for receiving therein with lateral clearance the ends of said bridgepiece, said recesses have spaced parallel side walls spaced apart a distance which is greater than the thickness of the bridgepiece to permit a limited transverse displacement of said bridgepiece, the bottom walls of said recesses forming said inclined abutment faces which limit the longitudinal displacement of said bridgepiece.

ARMIN WIRTH.

REFERENCES CITED

The following references are of record in the file of this patent:

UNITED STATES PATENTS

| Number | Name | Date |
|---|---|---|
| 1,057,881 | Robichaux | Apr. 1, 1913 |
| 1,369,208 | Wolhaupter | Feb. 22, 1921 |
| 1,378,425 | Rosebrook | May 17, 1921 |
| 1,665,906 | Bohannan | Apr. 10, 1928 |
| 2,361,873 | Rosebrook et al. | Oct. 31, 1944 |